(12) United States Patent
Wong

(10) Patent No.: US 6,714,829 B1
(45) Date of Patent: Mar. 30, 2004

(54) DUAL PATH SCHEDULING METHOD

(76) Inventor: Thomas K F Wong, 795 Panorama Dr., San Francisco, CA (US) 94131

( * ) Notice: Subject to any disclaimer, the term of this patent is extended or adjusted under 35 U.S.C. 154(b) by 771 days.

(21) Appl. No.: 09/602,598

(22) Filed: Jun. 22, 2000

(51) Int. Cl.[7] .......................... G06F 15/16; G06F 17/60
(52) U.S. Cl. ............................ 700/101; 705/8; 705/9; 715/526
(58) Field of Search ..................... 700/99, 100, 101, 700/102; 705/8, 9; 715/526

(56) References Cited

U.S. PATENT DOCUMENTS

| | | | | |
|---|---|---|---|---|
| 5,745,110 A | * | 4/1998 | Ertemalp | 345/764 |
| 5,890,134 A | * | 3/1999 | Fox | 705/9 |
| 6,256,651 B1 | * | 7/2001 | Tuli | 715/526 |
| 2002/0077879 A1 | * | 6/2002 | Uchida et al. | 705/9 |
| 2002/0169647 A1 | * | 11/2002 | Newbold | 705/8 |

* cited by examiner

Primary Examiner—Leo Picard
Assistant Examiner—Douglas S. Lee
(74) Attorney, Agent, or Firm—Thomas R. Lampe

(57) ABSTRACT

A method of scheduling a multi-task project includes identifying critical and para-critical tasks of the project. The critical tasks are ranked in a chronological order and displayed. The para-critical tasks are displayed adjacent to the displayed critical tasks. Target finish dates are established for the displayed critical tasks and the displayed critical tasks are monitored. Actual completion dates of the displayed critical tasks are displayed adjacent to the displayed critical tasks. The target finish dates for all subsequent displayed critical tasks are adjusted to reflect any variance between the target finish dates and actual finish dates.

20 Claims, 5 Drawing Sheets

FIG. 2

| CRITICAL TASKS | PARA-CRITICAL TASKS | Lot: | 100 | Plan: | 2000A | | | | Lot: | 101 | Plan: | 3000B | | | |
|---|---|---|---|---|---|---|---|---|---|---|---|---|---|---|---|
| | | Duratn | Target | C Actual | P Actual | Offset/Dlay | | Critl | Duratn | Target | C Actual | P Actual | Offset/Dlay | | Critl |
| | | Wk Day | Finsh | Finsh | Finsh | Code | Day | Var | Wk Day | Finsh | Finsh | Finsh | Code | Day | Var |
| Excavate Foundation | Excavate Plumbing | 1 | 01/04 | 01/07 | 01/07 | W | 4 | -3 | 1 | 01/04 | 01/07 | 01/07 | W | 4 | -3 |
| Form Footings | | 1 | 01/11 | 01/13 | | | | -2 | 1 | 01/11 | 01/13 | | | | -2 |
| Rough Plumbing | Set Electrical Panel | 2 | 01/13 | 01/17 | 01/14 | S | 2 | -4 | 2 | 01/13 | 01/17 | 01/14 | S | 2 | -4 |
| Footing Steel | confirm roof tile order | 1 | 01/18 | 01/19 | 01/19 | S | 1 | -1 | 1 | 01/18 | 01/19 | 01/19 | S | 1 | -1 |
| Footing Inspection | confirm lumber/trusses | 1 | 01/20 | 01/21 | 01/20 | S | 1 | -1 | 1 | 01/20 | 01/21 | 01/20 | S | 1 | -1 |
| Pour Footings | confirm window order | 1 | 01/24 | 01/24 | 01/20 | | | 0 | 1 | 01/24 | 01/24 | 01/20 | | | 0 |
| Prepare Slab | | 1 | 01/25 | 01/26 | | I | 1 | -1 | 1 | 01/25 | 01/26 | | I | 1 | -1 |
| Inspect Gravel | Termite Pretreat | 1 | 01/27 | 01/27 | 01/26 | | | 0 | 1 | 01/27 | 01/27 | 01/26 | | | 0 |
| Pour Slab | | 1 | 01/28 | 01/31 | | S | 1 | -3 | 1 | 01/28 | 01/31 | | S | 1 | -3 |
| Framing Layout | | 1 | 02/01 | 02/02 | | O | 1 | -1 | 1 | 02/01 | 02/02 | | O | 1 | -1 |
| Frame, Roof Truss & Sheet | Install Utilities (group) | 6 | 02/10 | 02/10 | 02/09 | S | 2 | 0 | 6 | 02/10 | 02/16 | 02/09 | S | 3 | -6 |
| Complet Frame, Inspect Shear | Gutters & Spot Jacks | 2 | 02/16 | 02/16 | 02/14 | | | 0 | 2 | 02/17 | 02/18 | 02/14 | | | -1 |
| Plumb Roof Vents | Windows, Ext. Doors, Fireplace | 1 | 02/17 | 02/18 | 02/17 | | | -1 | 1 | 02/18 | 02/18 | 02/17 | | | 0 |
| Shear Nail Inspection | | 1 | 02/18 | 02/18 | | | | 0 | 1 | 02/21 | | | | | |
| Plumbing Top-out | Felt/Load Roof | 2 | 02/22 | | | | | | 2 | 02/23 | | | | | |
| Rough HVAC | Start Lathe/Siding, Flash Ext. | 2 | 02/24 | | | | | | 2 | 02/25 | | | | | |
| Rough Electrical | | 2 | 02/28 | | | | | | 2 | 02/29 | | | | | |
| Alarm, Frame Prep/Sweep | | 1 | 02/29 | | | | | | 1 | 03/01 | | | | | |
| Frame Inspection | Frame Punch | 1 | 03/01 | | | | | | 1 | 03/02 | | | | | |
| Insulation | | 1 | 03/02 | | | | | | 1 | 03/03 | | | | | |
| Inspect Insulation | Stock Sheetrock (Group) | 1 | 03/03 | | | | | | 1 | 03/06 | | | | | |
| Hang Sheetrock | | 6 | 2 03/06 | | | | | | 6 | 2 03/08 | | | | | |
| Inspect Drywall Nail, Gas Test | Stucco, Ext Paint | 1 | 03/07 | | | | | | 1 | 03/09 | | | | | |
| Drywall Finish & Texture | Garage Doors | 6 | 7 03/15 | | | | | | 6 | 7 03/17 | | | | | |
| Sand Drywall | Deliver Interior Trim | 6 | 1 03/16 | | | | | | 6 | 1 03/18 | | | | | |
| Install Interior Trim | Fireplace Mantel/Veneer | 1 | 03/17 | | | | | | 1 | 03/20 | | | | | |
| Install Stair Rails | Lay Roof Tiles/Shingle Roof | 0 | 03/17 | | | | | | 0 | 03/20 | | | | | |
| Interior Paint Prep | Paint Sweep | 1 | 03/20 | | | | | | 1 | 03/21 | | | | | |
| Paint Flat | Flat Work (Group) | 1 | 03/21 | | | | | | 1 | 03/22 | | | | | |
| Paint Enamel | Sch Finish Grading (Group) | 1 | 03/22 | | | | | | 1 | 03/23 | | | | | |
| Install Cabinets | Masnry Vneer, Fenc Posts | 1 | 03/23 | | | | | | 1 | 03/24 | | | | | |
| Tile & Vanity Top | Measure Mirrors | 1 | 03/24 | | | | | | 1 | 03/27 | | | | | |
| Grout Tile, Rough Clean | Floor Prep, Deliver Lights | 1 | 03/27 | | | | | | 1 | 03/28 | | | | | |
| Install Vinyl | Deliver Appliances | 1 | 03/28 | | | | | | 1 | 03/29 | | | | | |
| Plumbing trim, Clean windw | Landscaping | 1 | 03/29 | | | | | | 1 | 03/30 | | | | | |
| Electrical trim, pm HVAC trim | | 1 | 03/30 | | | | | | 1 | 03/31 | | | | | |
| Base trim, Mirror, Shwr Dr | Firplace Dr., Chk Floor Squeeks | 1 | 03/31 | | | | | | 1 | 04/03 | | | | | |
| Hardware, Punch, Crpt Sweep | Fence Pickets, Wash Garage | 1 | 04/03 | | | | | | 1 | 04/04 | | | | | |
| Install Carpet | | 1 | 04/04 | | | | | | 1 | 04/05 | | | | | |
| Final Clean, pm Drywall Final | Closet Doors | 1 | 04/05 | | | | | | 1 | 04/06 | | | | | |
| Paint Final, Misc. Punch | Window Screens | 1 | 04/06 | | | | | | 1 | 04/07 | | | | | |
| Walk-thru, Final Inspection | | 1 | 04/07 | | | | | | 1 | 04/10 | | | | | |
| Final Punch & T. U. Clean | | 2 | 04/11 | | | | | | 2 | 04/12 | | | | | |
| Orientation/Key Release | | 1 | 04/12 | | | | | | 1 | 04/13 | | | | | |

FIG. 3

| Printed On: | 02/18/00 | | |
|---|---|---|---|
| TARGET START DATES | Lots: | 100 | 101 |
| Critical Tasks | Para-Critical Tasks | 2000A | 3000B |
| Excavate Foundation | Excavate Plumbing | 01/03 | 01/03 |
| Form Footings | | 01/10 | 01/10 |
| Rough Plumbing | Set Electrical Panel | 01/11 | 01/11 |
| Footing Steel | | 01/17 | 01/17 |
| Footing Inspection | | 01/19 | 01/19 |
| Pour Footings | | 01/21 | 01/21 |
| Prepare Slab | | 01/24 | 01/24 |
| Inspect Gravel | Termite Pretreat | 01/26 | 01/26 |
| Pour Slab | | 01/27 | 01/27 |
| Framing Layout | | 01/31 | 01/31 |
| Frame, Roof Truss & Sheet | *Install Utilities (group)* | 02/02 | 02/02 |
| Complet Frame, Inspect Shear | *Gutters & Spot Jacks* | 02/14 | 02/15 |
| Plumb Roof Vents | *Windows, Ext. Doors, Fireplace* | 02/16 | 02/17 |
| Shear Nail Inspection | | 02/17 | 02/18 |
| Plumbing Top-out | *Felt/Load Roof* | 02/18 | 02/21 |
| Rough HVAC | *Start Lathe/Siding, Flash Ext.* | 02/22 | 02/23 |
| Rough Electrical | | 02/24 | 02/25 |
| Alarm, Frame Prep/Sweep | | 02/28 | 02/29 |
| Frame Inspection | Frame Punch | 02/29 | 03/01 |
| Insulation | | 03/01 | 03/02 |
| Inspect Insulation | Stock Sheetrock (Group) | 03/02 | 03/03 |
| Hang Sheetrock | | 03/03 | 03/06 |
| Inspect Drywall Nail, Gas Test | *Stucco, Ext Paint* | 03/06 | 03/08 |
| Drywall Finish & Texture | Garage Doors | 03/07 | 03/09 |
| Sand Drywall | Deliver Interior Trim | 03/15 | 03/17 |
| Install Interior Trim | Fireplace Mantel/Veneer | 03/16 | 03/17 |
| Install Stair Rails | *Lay Roof Tiles/Shingle Roof* | 03/17 | 03/20 |
| Interior Paint Prep | Paint Sweep | 03/17 | 03/20 |
| Paint Flat | *Flat Work (Group)* | 03/20 | 03/21 |
| Paint Enamel | *Sch Finish Grading (Group)* | 03/21 | 03/22 |
| Install Cabinets | *Masnry Vneer, Fenc Posts* | 03/22 | 03/23 |
| Tile & Vanity Top | Measure Mirrors | 03/23 | 03/24 |
| Grout Tile, Rough Clean | Floor Prep, Deliver Lights | 03/24 | 03/27 |
| Install Vinyl | Deliver Appliances | 03/27 | 03/28 |
| Plumbing trim, Clean windw | *Landscaping* | 03/28 | 03/29 |
| Electrical trim, pm HVAC trim | | 03/29 | 03/30 |
| Base trim, Mirror, Shwr Dr | Firplace Dr., Chk Floor Squeeks | 03/30 | 03/31 |
| Hardware, Punch, Crpt Sweep | *Fence Pickets, Wash Garage* | 03/31 | 04/03 |
| Install Carpet | | 04/03 | 04/04 |
| Final Clean, pm Drywall Final | Closet Doors | 04/04 | 04/05 |
| Paint Final, Misc. Punch | *Window Screens* | 04/05 | 04/06 |
| Walk-thru, Final Inspection | | 04/06 | 04/07 |
| Final Punch & T. U. Clean | | 04/07 | 04/10 |
| Orientation/Key Release | | 04/11 | 04/12 |

FIG. 4

| CRITICAL TASKS | PARA-CRITICAL TASKS | Lot: | 100 | Plan: | 2000A | | | | Lot: | 101 | Plan: | 3000B | | | |
|---|---|---|---|---|---|---|---|---|---|---|---|---|---|---|---|
| | | Duratn | Target | C Actual | P Actual | Offset/Dlay | | Critl | Duratn | Target | C Actual | P Actual | Offset/Dlay | | Critl |
| | | Wk Day | Finsh | Finsh | Finsh | Code | Day | Var | Wk Day | Finsh | Finsh | Finsh | Code | Day | Var |
| Excavate Foundation | Excavate Plumbing | 1 | 01/04 | 01/07 | 01/07 | W | 4 | -3 | 1 | 01/04 | 01/07 | 01/07 | W | 4 | -3 |
| Form Footings | | 1 | 01/11 | 01/13 | | | | -2 | 1 | 01/11 | 01/13 | | | | -2 |
| Rough Plumbing | Set Electrical Panel | 2 | 01/13 | 01/17 | 01/14 | S | 2 | -4 | 2 | 01/13 | 01/17 | 01/14 | S | 2 | -4 |
| Footing Steel | confirm roof tile order | 1 | 01/18 | 01/19 | 01/19 | S | 1 | -1 | 1 | 01/18 | 01/19 | 01/19 | S | 1 | -1 |
| Footing Inspection | confirm lumber/trusses | 1 | 01/20 | 01/21 | 01/20 | S | 1 | -1 | 1 | 01/20 | 01/21 | 01/20 | S | 1 | -1 |
| Pour Footings | confirm window order | 1 | 01/24 | 01/24 | 01/20 | | | 0 | 1 | 01/24 | 01/24 | 01/20 | | | 0 |
| Prepare Slab | | 1 | 01/25 | 01/26 | | I | 1 | -1 | 1 | 01/25 | 01/26 | | I | 1 | -1 |
| Inspect Gravel | Termite Pretreat | 1 | 01/27 | 01/27 | 01/26 | | | 0 | 1 | 01/27 | 01/27 | 01/26 | | | 0 |
| Pour Slab | | 1 | 01/28 | 01/31 | | S | 1 | -3 | 1 | 01/28 | 01/31 | | S | 1 | -3 |
| Framing Layout | | 1 | 02/01 | 02/02 | | O | 1 | -1 | 1 | 02/01 | 02/02 | | O | 1 | -1 |
| Frame, Roof Truss & Sheet | Install Utilities (group) | 6 | 02/10 | 02/10 | 02/09 | S | 2 | 0 | 6 | 02/10 | 02/16 | 02/09 | S | 3 | -6 |
| Complet Frame, Inspect Shear | Gutters & Spot Jacks | 2 | 02/16 | 02/16 | 02/14 | | | 0 | 2 | 02/17 | 02/18 | 02/14 | | | -1 |
| Plumb Roof Vents | Windows, Ext. Doors, Fireplace | 1 | 02/17 | 02/18 | 02/17 | | | -1 | 1 | 02/18 | 02/18 | 02/17 | | | 0 |
| Shear Nail Inspection | | 1 | 02/18 | 02/18 | | | | 0 | 1 | 02/21 | 02/21 | | S | 3 | 0 |
| Plumbing Top-out | Felt/Load Roof | 2 | 02/22 | 02/25 | | S | 3 | -3 | 2 | 02/28 | | | | | |
| Rough HVAC | Start Lathe/Siding, Flash Ext. | 2 | 02/29 | | | | | | 2 | 03/01 | | | | | |
| Rough Electrical | | 2 | 03/02 | | | | | | 2 | 03/03 | | | | | |
| Alarm, Frame Prep/Sweep | | 1 | 03/03 | | | | | | 1 | 03/06 | | | | | |
| Frame Inspection | Frame Punch | 1 | 03/06 | | | | | | 1 | 03/07 | | | | | |
| Insulation | | 1 | 03/07 | | | | | | 1 | 03/08 | | | | | |
| Inspect Insulation | Stock Sheetrock (Group) | 1 | 03/08 | | | | | | 1 | 03/09 | | | | | |
| Hang Sheetrock | | 6 | 2 03/10 | | | | | | 6 | 2 03/11 | | | | | |
| Inspect Drywall Nail, Gas Test | Stucco, Ext Paint | 1 | 03/13 | | | | | | 1 | 03/13 | | | | | |
| Drywall Finish & Texture | Garage Doors | 6 | 7 03/21 | | | | | | 6 | 7 03/21 | | | | | |
| Sand Drywall | Deliver Interior Trim | 6 | 1 03/22 | | | | | | 6 | 1 03/22 | | | | | |
| Install Interior Trim | Fireplace Mantel/Veneer | 1 | 03/23 | | | | | | 1 | 03/23 | | | | | |
| Install Stair Rails | Lay Roof Tiles/Shingle Roof | 0 | 03/23 | | | | | | 0 | 03/23 | | | | | |
| Interior Paint Prep | Paint Sweep | 1 | 03/24 | | | | | | 1 | 03/24 | | | | | |
| Paint Flat | Flat Work (Group) | 1 | 03/27 | | | | | | 1 | 03/27 | | | | | |
| Paint Enamel | Sch Finish Grading (Group) | 1 | 03/28 | | | | | | 1 | 03/28 | | | | | |
| Install Cabinets | Masnry Vneer, Fenc Posts | 1 | 03/29 | | | | | | 1 | 03/29 | | | | | |
| Tile & Vanity Top | Measure Mirrors | 1 | 03/30 | | | | | | 1 | 03/30 | | | | | |
| Grout Tile, Rough Clean | Floor Prep, Deliver Lights | 1 | 03/31 | | | | | | 1 | 03/31 | | | | | |
| Install Vinyl | Deliver Appliances | 1 | 04/03 | | | | | | 1 | 04/03 | | | | | |
| Plumbing trim, Clean windw | Landscaping | 1 | 04/04 | | | | | | 1 | 04/04 | | | | | |
| Electrical trim, pm HVAC trim | | 1 | 04/05 | | | | | | 1 | 04/05 | | | | | |
| Base trim, Mirror, Shwr Dr | Firplace Dr., Chk Floor Squeeks | 1 | 04/06 | | | | | | 1 | 04/06 | | | | | |
| Hardware, Punch, Crpt Sweep | Fence Pickets, Wash Garage | 1 | 04/07 | | | | | | 1 | 04/07 | | | | | |
| Install Carpet | | 1 | 04/10 | | | | | | 1 | 04/10 | | | | | |
| Final Clean, pm Drywall Final | Closet Doors | 1 | 04/11 | | | | | | 1 | 04/11 | | | | | |
| Paint Final, Misc. Punch | Window Screens | 1 | 04/12 | | | | | | 1 | 04/12 | | | | | |
| Walk-thru, Final Inspection | | 1 | 04/13 | | | | | | 1 | 04/13 | | | | | |
| Final Punch & T. U. Clean | | 2 | 04/17 | | | | | | 2 | 04/17 | | | | | |
| Orientation/Key Release | | 1 | 04/18 | | | | | | 1 | 04/18 | | | | | |

FIG. 5

| Printed On: | 02/25/00 | | |
|---|---|---|---|
| TARGET START DATES | Lots: | 100 | 101 |
| Critical Tasks | Para-Critical Tasks | 2000A | 3000B |
| Excavate Foundation | Excavate Plumbing | 01/03 | 01/03 |
| Form Footings | | 01/10 | 01/10 |
| Rough Plumbing | Set Electrical Panel | 01/11 | 01/11 |
| Footing Steel | | 01/17 | 01/17 |
| Footing Inspection | | 01/19 | 01/19 |
| Pour Footings | | 01/21 | 01/21 |
| Prepare Slab | | 01/24 | 01/24 |
| Inspect Gravel | Termite Pretreat | 01/26 | 01/26 |
| Pour Slab | | 01/27 | 01/27 |
| Framing Layout | | 01/31 | 01/31 |
| Frame, Roof Truss & Sheet | Install Utilities (group) | 02/02 | 02/02 |
| Complet Frame, Inspect Shear | Gutters & Spot Jacks | 02/14 | 02/15 |
| Plumb Roof Vents | Windows, Ext. Doors, Fireplace | 02/16 | 02/17 |
| Shear Nail Inspection | | 02/17 | 02/18 |
| Plumbing Top-out | Felt/Load Roof | 02/18 | 02/24 |
| Rough HVAC | Start Lathe/Siding, Flash Ext. | 02/25 | 02/28 |
| Rough Electrical | | 02/29 | 03/01 |
| Alarm, Frame Prep/Sweep | | 03/02 | 03/03 |
| Frame Inspection | Frame Punch | 03/03 | 03/06 |
| Insulation | | 03/06 | 03/07 |
| Inspect Insulation | Stock Sheetrock (Group) | 03/07 | 03/08 |
| Hang Sheetrock | | 03/08 | 03/09 |
| Inspect Drywall Nail, Gas Test | Stucco, Ext Paint | 03/10 | 03/10 |
| Drywall Finish & Texture | Garage Doors | 03/13 | 03/13 |
| Sand Drywall | Deliver Interior Trim | 03/21 | 03/21 |
| Install Interior Trim | Fireplace Mantel/Veneer | 03/22 | 03/22 |
| Install Stair Rails | Lay Roof Tiles/Shingle Roof | 03/23 | 03/23 |
| Interior Paint Prep | Paint Sweep | 03/23 | 03/23 |
| Paint Flat | Flat Work (Group) | 03/24 | 03/24 |
| Paint Enamel | Sch Finish Grading (Group) | 03/27 | 03/27 |
| Install Cabinets | Masnry Vneer, Fenc Posts | 03/28 | 03/28 |
| Tile & Vanity Top | Measure Mirrors | 03/29 | 03/29 |
| Grout Tile, Rough Clean | Floor Prep, Deliver Lights | 03/30 | 03/30 |
| Install Vinyl | Deliver Appliances | 03/31 | 03/31 |
| Plumbing trim, Clean windw | Landscaping | 04/03 | 04/03 |
| Electrical trim, pm HVAC trim | | 04/04 | 04/04 |
| Base trim, Mirror, Shwr Dr | Firplace Dr., Chk Floor Squeeks | 04/05 | 04/05 |
| Hardware, Punch, Crpt Sweep | Fence Pickets, Wash Garage | 04/06 | 04/06 |
| Install Carpet | | 04/07 | 04/07 |
| Final Clean, pm Drywall Final | Closet Doors | 04/10 | 04/10 |
| Paint Final, Misc. Punch | Window Screens | 04/11 | 04/11 |
| Walk-thru, Final Inspection | | 04/12 | 04/12 |
| Final Punch & T. U. Clean | | 04/13 | 04/13 |
| Orientation/Key Release | | 04/17 | 04/17 |

DUAL PATH SCHEDULING METHOD

TECHNICAL FIELD

This invention relates to a method of scheduling a project consisting of a plurality of tasks. The invention is applicable, for example, to building construction projects.

BACKGROUND OF THE INVENTION

Building projects and other types of projects as well are of a multi-task nature; that is, completion of the project from beginning to end is accomplished by carrying out a plurality of established tasks, the tasks often being of an interrelated nature requiring an established sequence or prioritization.

A number of approaches ranging from semi-formal to formal have been devised and employed in the past to schedule tasks of a multi-task project. Prior art approaches can be relatively inefficient and do not necessarily lend themselves to efficient and proper management of a project, particularly where a large number of sub-projects are involved, as in carrying forward a subdivision construction project. In addition, recording of such schedules utilizing prior approaches can be complicated and complex, yet still not function as an efficient tool providing the information desired to properly plan, evaluate and manage a project. Nor do conventional prior art scheduling approaches provide good bases for analyzing past activities so that performance improvements can be made in the future.

DISCLOSURE OF INVENTION

The present invention relates to a scheduling method which provides a highly effective management tool. The method is relatively simple as compared to often complicated prior art scheduling methods and there is no need for employing bar charts or similar graphic displays to provide the desired information. Utilizing the method of the present invention, the critical path of the project is brought into clear focus for effective schedule management purposes.

The present invention encompasses a method of scheduling a project consisting of a plurality of tasks and includes the step of identifying critical tasks of the project.

The method also includes identifying para-critical tasks of the project.

The critical tasks are displayed in a visually perceptible manner with the critical tasks ranked in chronological order.

The identified para-critical tasks are displayed in a visually perceptible manner adjacent to the displayed critical tasks.

Target finish dates are established for the displayed critical tasks and a target finish date is displayed for each of the displayed critical tasks adjacent to the respective displayed critical task.

The performance of the displayed critical tasks is monitored to establish actual completion dates of the displayed critical tasks and the actual completion date of each displayed critical task is displayed adjacent to the associated displayed critical task upon completion thereof.

The target finish dates for all subsequent displayed critical tasks are adjusted to reflect any variance between the target finish date and the actual finish date of a displayed critical task.

The method also includes the step of notifying parties responsible for completion of at least one of the displayed tasks of the target start dates thereof.

Other features, advantages, and objects of the present invention will become apparent with reference to the following description and accompanying drawings.

BRIEF DESCRIPTION OF DRAWINGS

FIG. 2 is a representative scheduling sheet for a construction project prepared in accordance with the method;

FIG. 3 is a target start schedule sheet based on the scheduling sheet of FIG. 2;

FIG. 4 is a scheduling sheet similar to that of FIG. 2 but updating data as a result of a delay of a critical task; and FIG. 5 is a target start schedule sheet similar to that of FIG. 3 but updated from information on the scheduling sheet of FIG. 4.

BEST MODE FOR CARRYING OUT THE INVENTION

Figure 1:
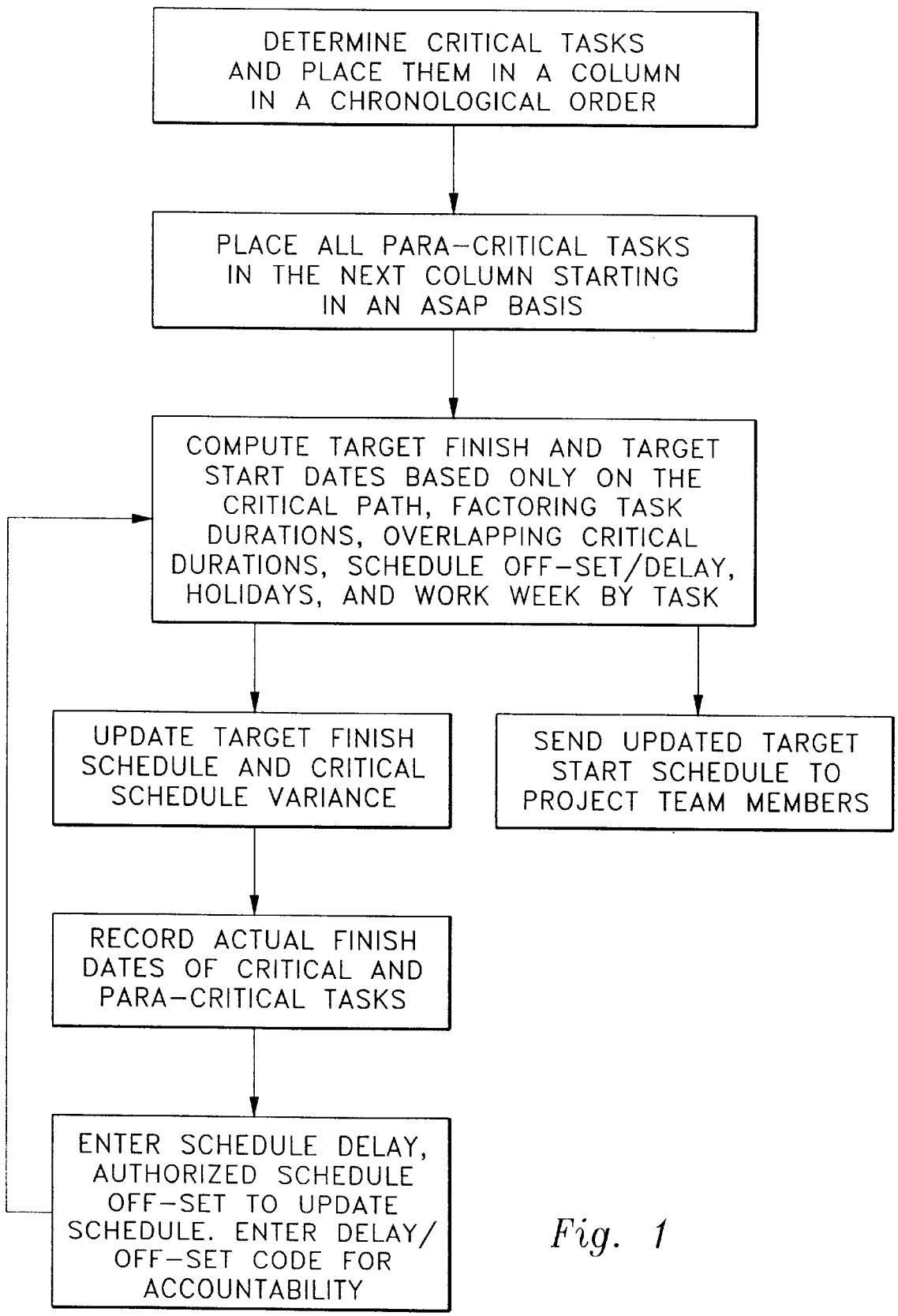
FIG. 1 is a flow diagram illustrating sequential steps of the method of the present invention.

Referring now to the drawings, the method of the present invention is illustrated as it is applied to a construction project, it of course being understood that the method is applicable to other types of multi-task projects.

FIG. 2 illustrates a representative scheduling sheet for a construction project prepared in accordance with the method of the present invention.

The first step of the method comprises identifying critical tasks of the project, critical tasks essentially being activities with no slack time. The critical tasks are displayed in column form on a chronological basis. It will be appreciated that the visually perceptible display can, for example, be either on a computer screen or on a sheet or sheets of paper, or both.

The para-critical tasks of the project are also identified and displayed in column form in a visually perceptible manner on the scheduling sheet adjacent to the displayed critical tasks. The para-critical tasks are those tasks having slack time. The trivial tasks of the project need not be scheduled; the marginal trivial tasks may, however, be placed in the para-critical task category at the scheduler's discretion.

To the right of the task columns on the scheduling sheet is a scheduling section, which includes the type of work week, critical task duration, target finish dates of the critical tasks, the actual finish dates of the critical tasks, the actual finish dates of the para-critical tasks, authorized critical task start-offset/delay with schedule updating, and critical variance (the difference between target and actual finish dates of the critical task).

The scheduling sheet may include codes or other identifiers, as desired. In the illustrated scheduling sheet bold type is used to identify milestones, italic type for identifying exterior work, lower case for scheduler's notes, and (Group) for multiple-lot activities.

Insofar as the offset/delay code is concerned, W designates weather delay, S denotes subcontractor delay, I shows inspection delay, C signifies change order delay, and O indicates authorized offset. Multiple codes and delay durations may be entered for each critical task with a pull-down menu for accurate accountability.

Each critical task may have a different work week, the default being a 5-day week, 6 for a work week including Saturday and 7 for a seven day week.

The goal of the schedule manager is to complete the tasks on or before the target finish dates. On a separate sheet (or individual messages), the target start dates are tabulated and distributed to the responsible parties of the tasks; any scheduling updates will update the target start dates and the responsible parties are informed. The task duration may be part of the target start date sheet (or message), or may be pre-set and mutually agreed to by the parties. FIG. 3 illustrates a target start schedule sheet based on the scheduling sheet of FIG. 2. The target start schedule may be sent by fax, automatic e-mail, or by a controlled Internet access, for example.

The scheduling management function is also separated into two groups (paths): "human assisted" and "machine assisted". The para-critical tasks fall into the human assisted category. These tasks are scheduled to start on an as soon as possible basis (as high as possible on the para-critical tasks column). Although the actual finish dates of the para-critical tasks are recorded for record keeping and for monitoring to prevent them from becoming critical, their scheduling management is by human intelligence.

The management of inter-dependency among the tasks and group activities (e.g. constructing a group of driveways of multiple-lot projects) is also accomplished by human intelligence. This approach takes full advantage of what humans can do best in a real world setting and greatly simplifies schedule setup and implementation.

The performance of the displayed critical tasks is monitored to establish actual completion dates of the displayed critical tasks. And, as indicated above, the actual completion date of the each displayed critical task is displayed adjacent to the associated displayed critical task upon completion thereof.

The target finish dates for all subsequent displayed critical tasks are adjusted to reflect any variance between the target finish date and the actual finish date of a displayed critical task. By way of example, FIG. 4 illustrates an updated scheduling sheet indicating that Lot 100 encountered a 3-day delay at the stage of plumbing top-out due to the plumber arriving 3 days late to the job site. Assuming the task duration cannot be compressed and this plumber doesn't work weekends to catch up, as a result, the critical path is delayed by 3 days. To document the resultant delay and to update the project schedule, the scheduler simply enters the offset/delay code "S" for subcontractor delay, the offset/delay duration of 3 days, and both the target finish dates and the target start dates of the subsequent tasks are updated automatically. The appropriate persons have the revised target start schedule sheet of FIG. 5 sent to them.

In the case of a contractor showing up late to start work, the subsequent lots in the same project are also affected. Even if Lot 101 was on target with the prior tasks, its schedule also needs to be adjusted by three more days as the plumber start date on this lot will also be delayed by three days. By simply updating the offset/delay duration, Lot 101's schedule is also made current. It should be noted that three working days of delay may lead to longer calendar day delays due to the weekends (or a five day work week).

FIG. 1 illustrates a flow chart or diagram illustrating sequential steps of the method of the present invention.

The management of the critical tasks is machine assisted by way of calculator or computer. The tracking and updating of the critical task schedules such as the calculation of holidays, number of days in a work week, task duration, authorized schedule off-set, delay duration and calendar dates are computed by machine, which is best at number crunching. By identifying and placing all critical tasks in a chronological descending order in one column, together with the information in the scheduling section, the critical path is brought into clear focus for effective schedule management. There is no need for bar charts and other complicated scheduling methods.

Overlapping critical tasks can be combined to form one compound critical task to simplify computation of task interdependency or handled by adding an additional column in the scheduling section next to the task duration to account for the overlapping critical duration of the critical tasks. Additional computation routines need to be introduced into the schedule calculation in the latter case. There is no change to the method or presentation of the schedule.

Once the initial schedule is created, it should be saved for base line comparison. The subsequent updating is simply done by entering adjustments in the column for authorized schedule off-set/delay and updating. This method automatically shows the audit trail of the revised target finish dates and actual finish dates of the critical tasks throughout the course of the project without any further work and in the same single concise scheduling sheet for easy project performance evaluation. There is no need to review multiple revised schedules generated by standard scheduling methods.

In addition, the schedule off-set/delay can be easily coded for accountability analysis. The authorized schedule off-set is an innovative concept to factor planned management schedule adjustment and intervention for clear accountability (e.g. building winter foundations in advance and not holding superintendent responsible for no construction activities).

This dual path scheduling method lends itself to managing single or multiple similar projects simultaneously, thus greatly enhancing a schedule manager's capacity to handle a large scheduling workload. In a computerized version of this method, a manager can easily plan and revise the schedules "on the fly" to meet the target finish dates, by adjusting variables such as the duration and work week, and on multiple projects, all in one intuitive scheduling sheet.

The invention claimed is:

1. A method of scheduling a project consisting of a plurality of tasks, said method comprising the steps of:
   identifying critical tasks of the project;
   identifying para-critical tasks of the project;
   displaying the critical tasks in a visually perceptible manner with the critical tasks ranked in chronological order;
   displaying the identified para-critical tasks in a visually perceptible manner adjacent to the displayed critical tasks;
   establishing target finish dates for the displayed critical tasks and displaying a target finish date for each of the displayed critical tasks adjacent to the respective displayed critical task;
   monitoring performance of the displayed critical tasks to establish actual completion dates of the displayed critical tasks;
   displaying the actual completion date of each displayed critical task adjacent to the associated displayed critical task upon completion thereof; and
   adjusting the target finish dates for all subsequent displayed critical tasks to reflect any variance between the target finish date and the actual finish date of a displayed critical task.

2. The method according to claim 1 additionally comprising the step of notifying parties responsible for completion of at least one of the displayed tasks of the target start date thereof.

3. The method according to claim 2 wherein said step of notifying parties responsible for completion of at least some of said displayed tasks includes keeping said parties advised of any revision thereof.

4. The method according to claim 1 wherein said project is a construction project and wherein said plurality of tasks comprise tasks related to said construction project.

5. The method according to claim 1 wherein each para-critical task is displayed next to a critical task having a start date closest to the start date of the para-critical task.

6. The method according to claim 5 wherein said displayed para-critical tasks are ranked according to a preferred order of performance with respect to one another and with respect to displayed critical tasks, with each para-critical task being carried out on an as soon as possible basis.

7. The method according to claim 1 additionally comprising the step of adjusting target finish dates for said para-critical tasks responsive to adjustment of the target finish date of one or more of said displayed critical tasks.

8. The method according to claim 2 wherein said tasks are displayed in a visually perceptible manner on at least one scheduling sheet, said step of notifying parties responsible for completion of at least one of said displayed tasks comprising transferring selected information from said at least one scheduling sheet to a target start schedule and distributing said target schedule to a selected party or parties.

9. The method according to claim 1 wherein said critical tasks are displayed in a first column and said para-critical tasks are displayed in a second column alongside said first column.

10. The method according to claim 9 wherein said target finish dates are displayed in a third column disposed proximate to said first and second columns.

11. The method according to claim 1 additionally comprising the steps of recording and displaying the period of any variance between the target finish date and the actual finish date of a displayed critical task.

12. The method according to claim 1 additionally comprising the steps of recording and displaying the reason for any variance between the target finish date and the actual finish date of a displayed critical task.

13. The method according to claim 1 additionally comprising the steps of identifying and combining a plurality of overlapping critical tasks and displaying the combined critical tasks in a visually perceptible manner as a single compound critical task.

14. The method according to claim 1 additionally comprising the steps of identifying a plurality of overlapping critical tasks and accounting for the overlapping critical duration in schedule computation.

15. The method according to claim 1 additionally comprising the step of comparing a plurality of visually perceptible displays of target finish dates and actual finish dates of critical tasks at intervals over the period of time of said project for evaluating the performance of parties performing the critical tasks during said project.

16. The method according to claim 1 wherein said critical tasks and said para-critical tasks are displayed in a visually perceptible manner or typed or printed scheduling sheets.

17. The method according to claim 1 wherein said critical tasks and said para-critical tasks are displayed on a computer screen.

18. The method according to claim 1 wherein the step of adjusting the target finish dates for all subsequent displayed critical tasks to reflect any variance between the target finish date and the actual finish date of a displayed critical task is carried out by a suitably programmed computer.

19. The method according to claim 1 additionally comprising the steps of recording and displaying identification of those responsible for any variance between the target finish date and the actual finish date of a displayed critical task.

20. The method according to claim 1 additionally comprising the step of adjusting a project schedule by schedule off-set to facilitate accountability analysis.

* * * * *